F. L. JAHN.
PRESSURE REGULATING VALVE.
APPLICATION FILED AUG. 17, 1917.

1,245,725.

Patented Nov. 6, 1917.
2 SHEETS—SHEET 1.

INVENTOR
Frederick L. Jahn.
BY Wiedersheim Fairbanks
ATTORNEYS

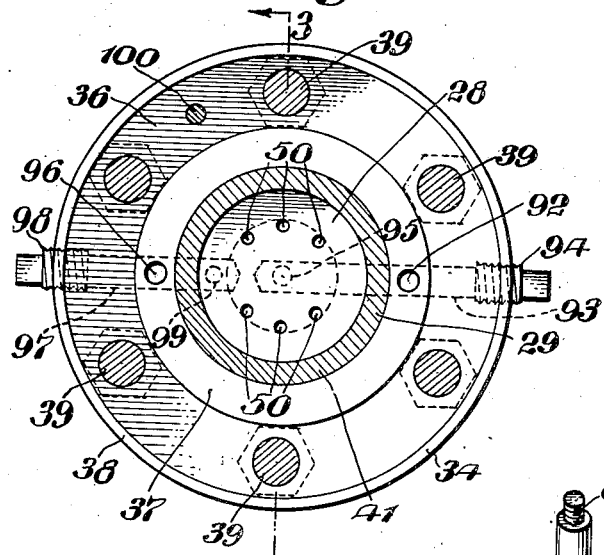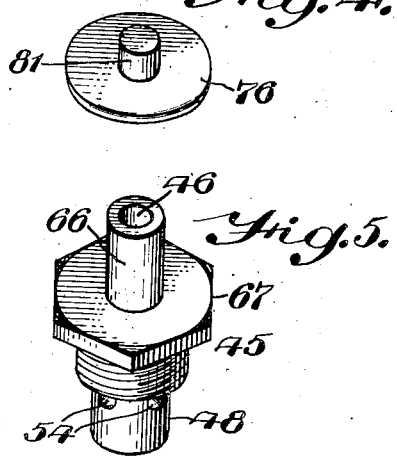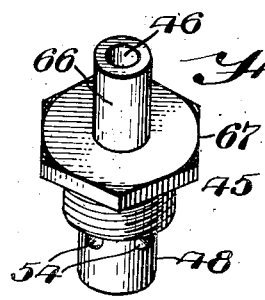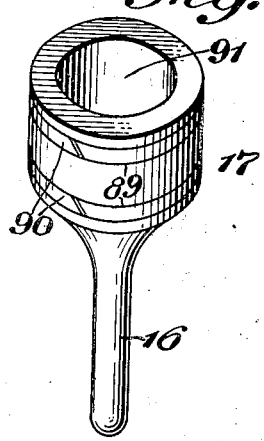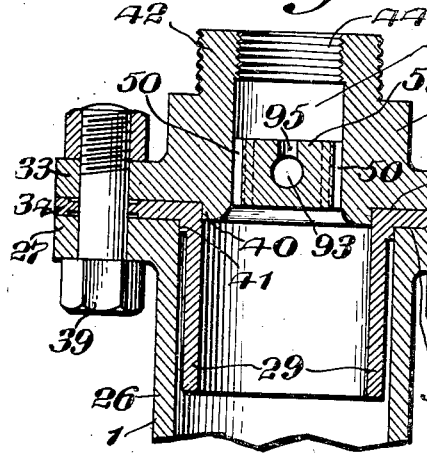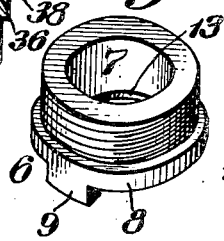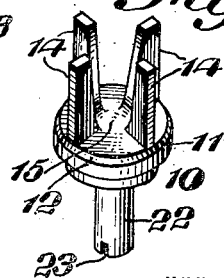

UNITED STATES PATENT OFFICE.

FREDERICK L. JAHN, OF PHILADELPHIA, PENNSYLVANIA, ASSIGNOR TO WATSON AND McDANIEL COMPANY, OF PHILADELPHIA, PENNSYLVANIA, A CORPORATION OF PENNSYLVANIA.

PRESSURE-REGULATING VALVE.

1,245,725.   Specification of Letters Patent.   Patented Nov. 6, 1917.

Application filed August 17, 1917. Serial No. 186,672.

*To all whom it may concern:*

Be it known that I, FREDERICK L. JAHN, a citizen of the United States, residing in the city and county of Philadelphia, State of Pennsylvania, have invented a new and useful Pressure-Regulating Valve, of which the following is a specification.

My invention comprehends a novel construction of a pressure regulator valve for reducing and automatically controlling a fluid pressure, together with means whereby the fluid pressure at the outlet thereof will have but slight pressure variation in respect to the degree of pressure to which the valve is regulated.

A further object of my invention is to provide a novel pressure regulator valve, whereby means are provided to automatically operate the valve to shut off the fluid supply from the inlet to the outlet thereof, together with means for substantially eliminating a rise in the service pressure at the outlet over the pressure at which the valve is regulated when the working load is removed.

Another object of my invention is to provide a novel pressure-regulator valve in which the diaphragm for automatically operating the auxiliary valve by the reduced steam pressure is so arranged in respect to the outlet portion of the valve that the water of condensation from said steam is precipitated by gravity away from the diaphragm and conducted and discharged into said outlet, whereby the diaphragm throughout its entire pressure area is subjected to the steam temperature alone, thereby eliminating irregular expansion and contraction of the diaphragm so common in valves where the diaphragm is subjected both to a steam temperature and also to the temperature of the water of condensation from said steam.

Another object of my invention is to provide a novel reducing regulator valve comprising a main valve, auxiliary valve, a reinforced regulator fluid pressure diaphragm contacting with said auxiliary valve for the automatic control of the latter and a piston controlled by said auxiliary valve, said piston being adapted to operate the main valve, all of the foregoing elements being readily interchangeable and arranged in preferably vertical, axial alinement in respect to each other in conjunction with a sectional casing inclosing the foregoing parts to permit the examination and adjustment of said parts independent of each other, there being means to allow for the interchanging of a diaphragm with one of a different pressure area, the joints of the contacting parts being machined thereby eliminating the use of gaskets and insuring tight seals between the several parts during the operation of the valve.

A still further object of my invention is to provide a novel pressure regulator valve wherein the operative parts thereof are preferably arranged in vertical, axial alinement in respect to each other to insure the positive action of all the parts in operation under varying conditions.

Another object of my invention is to provide a novel pressure regulator valve so constructed and arranged as to allow for the ready examination, removal and replacement of the parts thereof without special tools and without removing the valve from the pipe line or dismantling the same to any extent.

For the purpose of illustrating my invention, I have shown in the accompanying drawings preferred embodiments which are at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 2 represents a sectional view partly in elevation on line 2—2 Fig. 1.

Fig. 3 represents a fragmentary, sectional view on line 3—3, Fig. 2, with the main valve control piston and the auxiliary valve removed.

Figs. 4, 5, 6, 7, 8 and 9 represent detail, perspective views of the several operative parts, in detached position.

Similar numerals of reference indicate corresponding parts in the figures.

Figure 1:
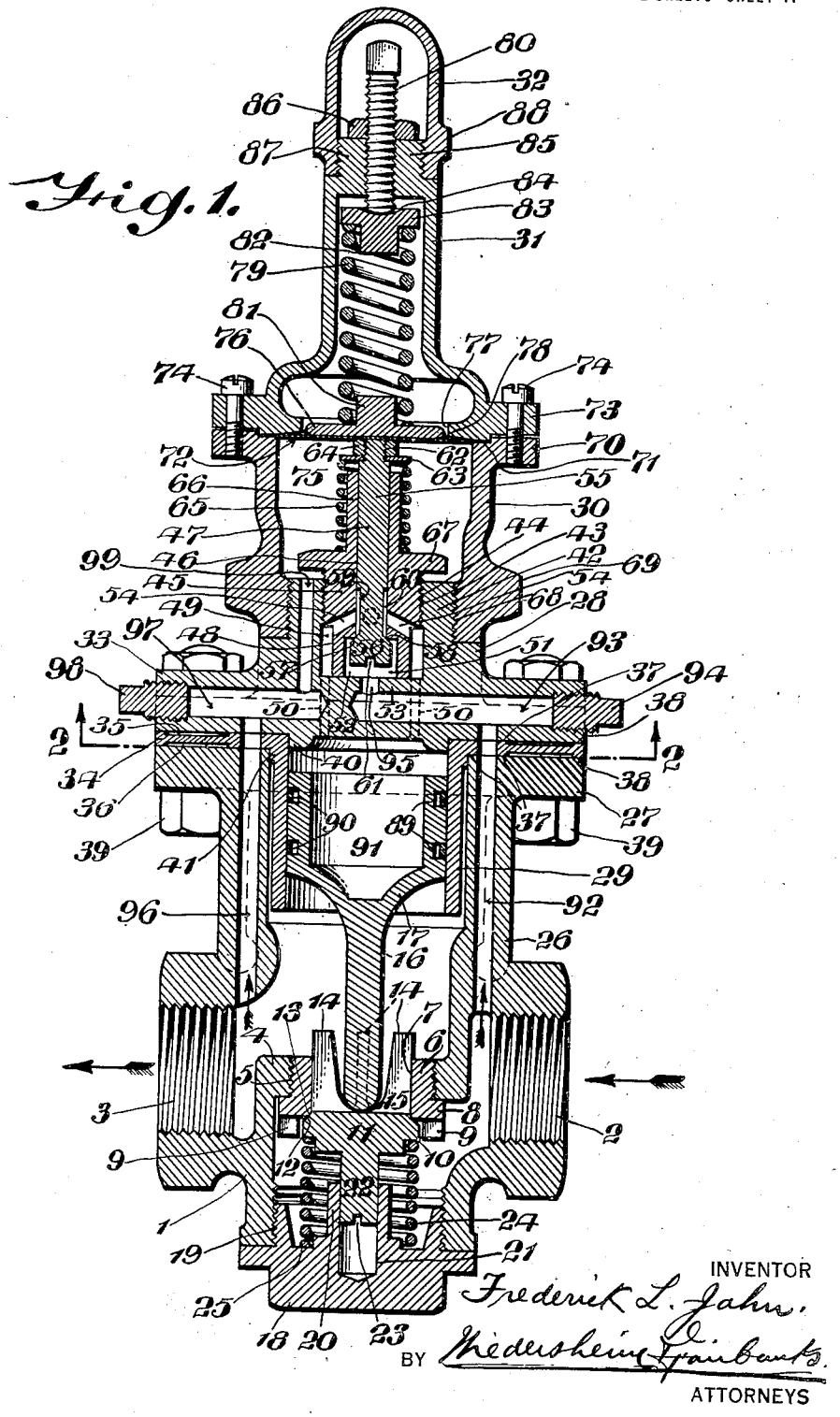
Figure 1 represents a vertical section of a pressure regulator valve embodying my invention, certain of the parts being shown in elevation.

Referring to the drawings, 1 designates the main body portion or casing of my novel regulator valve having an inlet 2 and an outlet 3. 4 designates a horizontally disposed partition interposed between the inlet 2 and the outlet 3. 5 designates a threaded opening in the partition 4 for the reception of a threaded guide-sleeve 6 having a valve opening 7 to effect communication between the inlet 2 and the outlet 3. The sleeve 6 is flanged, as at 8, and provided with the lugs 9 for the application of a wrench thereto for the ready insertion and removal of said sleeve in respect to the partition 4.

10 designates a main valve for controlling the flow of liquid through the valve opening 7, said main valve 10, as seen in Fig. 9, consisting of a valve disk 11, beveled as at 12, to form the valve proper which engages the beveled edge or seat 13 of the valve opening 7. 14 designates upwardly extending lugs projecting from the main valve disk or body 11 to guide said main valve in respect to the valve opening 7. Between the lugs 14 is formed a concave pocket or seat 15 for the reception of the stem 16 of the actuating piston 17, seen in Fig. 7, which effects the actuation of the valve 10, as will be hereinafter described.

18 designates a hexagon or polygonally headed flanged plug screwed into and closing the opening 19 in the main body portion 1 of the valve through which the sleeve 6 and the main valve 10 are inserted into the valve casing. The plug 18 is provided with an upward extension 20 having a guide opening 21 for the reception of the downwardly extending stem 22 of the main valve 10, said stem being slotted as at 23 for the application of a screw driver thereto in regrinding the valve seats 12 and 13 respectively. 24 designates a spring located between the headed portion 11 of the valve 10 and the inside face 25 of the plug 18 whose tension normally holds the valve 10 in closed position with respect to the valve opening 7.

The casing of the valve proper is made up in several sections consisting of the main body portion 1 which is provided with an integral upwardly extending substantially tubular casing 26, the upper portion of which is flanged at 27 to afford supporting and removable securing means for an auxiliary or pilot valve casing 28 and a piston cylinder 29 in respect to the main body portion 1 of the valve.

30 designates an intermediate casing removably secured to the auxiliary valve casing 28. 31 designates a hood casing removably secured to the casing 28 and inclosing the regulator spring 79 and holding the operating diaphragm 72 in position. 32 designates a cap removably secured to the casing 31 for inclosing the regulator screw 80.

33 designates a flanged extension of the auxiliary valve casing 28 between which flange 33 and the flange 27 of the casing 26 is interposed the laterally extending flange 34 of the piston cylinder 29, see Figs. 1 and 3. The flange 34 is grooved on its upper and lower faces, as at 35 and 36, to form the inner and outer bearing faces 37 and 38 between the flanges 27 and 33 to make a tight seal between the several flanges adjacent to the passageways therethrough and also to insure the piston cylinder being held in a central position against tilting in respect to the casing 26 when the bolts 39 are tightened to hold said casing 26, piston cylinder 29 and auxiliary valve casing 28 in assembled position as a unitary structure.

The auxiliary valve casing 28 is provided with a machined shouldered extension 40 engaging in the bore of the piston cylinder 29. 41 designates a machined shouldered extension on the piston for engaging the inside periphery of the casing 26 to further insure the piston cylinder 29 being held in perfect central alinement in respect to the auxiliary valve casing 28 and the casing 26 when the above parts are in assembled position.

The auxiliary valve casing 28 is formed with an integral upward extension 42 having a pocket 43 therein screw threaded as at 44 for the reception of the guide sleeve 45 (see Fig. 5) having a bore 46 for the mounting and guiding of an auxiliary or pilot valve 47 (see Fig. 6). The sleeve 45 is of reduced diameter, as at 48, to provide an annular chamber 49 between the sleeve and the side and bottom wall of the pocket 43. 50 designates vertical ports or passages effecting communication between the annular chamber 49 and the piston cylinder 29, see Figs. 2 and 3.

The bore 46 of the sleeve 45 is enlarged at its bottom as at 51, see Fig. 1, to produce a communicating pocket 52 in the sleeve 45 the bottom of said pocket 52 being seated and sealed against the wall 53 of the auxiliary valve casing 28.

54 designates ports effecting communication between the annular chamber 49, the bore 46 and the pocket 52.

The pilot valve 47 consists of a stem 55 provided at its lower portion in the pocket 52 with an enlarged head 56 beveled at 57 to engage a valve seat 58 at the lower portion of the bore 46 to open and close communication between the annulus 49 and the pocket 52 above referred to.

The stem 55 above the beveled face 57 thereof is peripherally recessed or of reduced diameter, as at 59, to form an annular chamber 60 in the bore 46 affording communication between the ports 54 and the pocket 52 when the auxiliary valve 47 is in its open or unseated position.

61 designates a slot in the enlarged head 56 to allow for the application of a screw driver thereto for regrinding the valve seat 58 in respect to the beveled face 57 of the valve.

The upper portion of the stem 55 is screw threaded and shouldered as at 62 for the reception of a washer 63 and a nut 64. 65 designates a spring positioned around a reduced integral tubular extension 66 of the guide sleeve 45. The spring 65 extends between the upper portion of a polygonal and preferably integral head or enlargement 67 of the guide sleeve 45 and the washer 63 so that by its tension it will normally hold the valve 47 in a closed position in respect to the valve seat 58.

The polygonal faced head 67 affords means whereby the pilot valve 47 and sleeve 45 (wherein the valve 47 is mounted) may be readily removed and replaced with respect to the casing 28. The upper portion of the extension 42 is reduced and threaded as at 68 and is in threaded engagement with the casing 30. 69 designates a polygonal faced enlargement integral with the casing 30 to permit the application of a wrench thereto to securely screw said casing to the threaded extension 42.

70 designates a flange at the upper portion of the casing 30 preferably integral therewith and recessed at 71 for the reception of the peripheral portion of a pressure diaphragm 72 held between the flange 73 of the casing 31 and said flange 70 by the bolts 74. The chamber 75 within the casing 30 is in communication with the outlet 3 of the valve through the passages 99, 97 and 96 as will be hereinafter fully described.

76 designates a disk positioned on the diaphragm 70 which is guided vertically in the opening 77 formed within the inwardly extending flange 78 of the casing 31. The diaphragm 72 is held against the nut 64 of the valve 47 by the tension of the spring 79, the compression of which is regulated by the regulating screw 80.

The disk 76 is so designed to cover a considerable area of diaphragm so as to act as reinforcing means against pressure below. The lower end of the spring 79 is positioned around a lug 81 of the disk 72 while the upper end of said spring 79 is positioned around a lug 82 on the centering washer 83 whose top is dished out as at 84 to form a seat for the regulating screw 80 screwed into the cap or top closure 85 of the casing 31, said regulating screw 80 being provided with a lock-nut 86 for locking it in respect to the casing 31, when the valve is set for the desired reduced pressure. The cap 32 is adapted to be screwed to the threaded extension 87 of the casing 31 to inclose the regulating screw 80. 88 designates a polygonal faced enlargement on the cap 32 for securely screwing the latter to the casing 31.

The piston 17 is peripherally grooved as at 89 to receive the expansible metallic packing rings 90 to prevent leakage and is hollowed out as at 91 to form a pocket to receive the steam discharge into the cylinder 29 to actuate the piston 17 to control the main valve 10. The piston 17 is formed conical or tapering in cross section between the body 17 thereof and the stem 16 to deflect the steam and prevent horizontal expansion of the piston.

92 designates a vertical passage leading from the inlet side of the valve through the wall of the casing 26 through the flange 34 of the cylinder 29 and through the auxiliary valve casing 28 thence communicating with a lateral passage 93 therein. This passage 93 at one end is plugged at 94 while the other end is in communication with the pocket 52 through the passage 95 in the wall 33 of the casing 28.

96 designates a passage leading from the outlet side of the valve through the wall of the casing 26 thence through the flange 34 of the cylinder 29 and through the auxiliary valve casing 28 into the lateral passage 97 therein. The end of this passage 97 is plugged at 98 while the other end of the passage 95 is in communication with the chamber 75 through the passage 99 in the auxiliary valve casing 28.

100 designates a dowel pin passing through the flanges 27, 33, 34 of the main body portion, auxiliary valve portion 28 and the piston cylinder portion 29 to insure proper alinement of the several ports and passages during the assembling thereof.

The operation is as follows:—

Fluid, preferably steam, is admitted to the inlet 2 from any source of supply as a suitable steam generating agency. The outlet 3 thereof is in communication through a service pipe line (not shown) with any steam consuming device, where it is desirable to supply steam at a uniform regulated pressure. The service pipe line may be provided with a pressure indicator (not shown) in accordance with which the valve is regulated.

In the initial regulating or setting of the valve, the operator removes the cap 32 and manipulates the regulator screw 80 to operate the pilot valve 47 so as to unseat or move the valve 57 downwardly away from its valve seat 58 allowing for the desired pressure of steam from the inlet 2 through the passages 92, 93, 95, 52, 46, 54, 49 and 50 into the piston cylinder 29 which depresses the piston 17 which simultaneously moves the main valve 10 downwardly to open the main valve opening 7 thereby permitting the steam to pass from the inlet 2 of the valve to the outlet 3 thereof. With steam passing from the outlet 3 through the service line (not shown) the pressure indicator located therein will be operated to indicate the pressure of the steam supplied from the outlet 3 of the valve thereby affording indicating means to the operator to guide him in the manipulation or setting of the pilot valve 47 to control the main valve 10 to bring the steam at the outlet to the desired reduced pressure.

The operator having adjusted the screw 80 to the desired extent, locks it in position by the lock nut 86 and replaces the cap 32.

To automatically control the supply of steam from the inlet 2 to the outlet 3 of the valve, the diaphragm 72 is provided, which is subject to steam pressure from the outlets 3 through the passages 96, 97 and 99, said steam entering the chamber 75 above which said diaphragm is located and said diaphragm 72 being in operative connection with the auxiliary valve 47 and thereby controlling the main valve 10 through the intermediate connections already described.

The diaphragm 72 is so located in respect to the outlet 3 of the valve that water of condensation from the steam supplied from the outlet 3 to actuate said diaphragm is precipitated by gravitation back into said outlet.

It will be seen from the foregoing that one of the advantageous features of my invention is the positioning of the main valve 10, the piston 17 with its stem 16, the piston cylinder 29, the auxiliary valve 47, the diaphragm 72, the upper and lower spring connected therewith, and the adjusting screw 80 in axial alinement in the same vertical plane, whereby all the moving parts are actuated in the same vertical line, so that the device is very sensitive, accurate, reliable and efficient under all conditions.

It will be further apparent that by reason of the provision of the lateral flange 34 on the cylinder 29, which is secured between the flanges 27 and 33 in conjunction with the shoulders 40 and 41, see Fig. 3, the depending cylinder 29 is always retained in exact vertical alinement and prevented from shifting so that the piston 17 will not tend to bind therein, but will reciprocate in a true vertical line according to variations of pressure exerted thereon through the ports 50.

It will be furthermore apparent that by reason of the location of the stem 16 in vertical alinement with the seat 15 between the lugs 14 of the main valve 10, in conjunction with the cylinder 29 locked in position as described, the parts 17, 16 and 10 will always simultaneously move in unison in rectilinear axial alinement, so that the valve 10 will respond readily to any variations of pressure.

It will further be apparent that by making the intermediate casing 30 in threaded engagement with the threaded extension 42 of the pilot valve casing 28, the parts can be readily unscrewed by the application of a wrench to the portion 69, after which by the application of a wrench to the polygonal head 67 of the sleeve 45, said sleeve together with the valve 47 and its adjuncts can be readily removed for the purpose of inspection, replacement or repairs. The valve 47 obviously can be readily removed from the sleeve 45 upon the removal of the nut 64. To obtain access to the cylinder 29 and the piston 17 it is only necessary to remove the bolts 39, whereupon the section 30 and its adjuncts will be readily accessible. By the provision of the recesses 35 and 36 above and below the flange 34, as will be understood from Figs. 1 and 3, a tight joint will be formed without necessitating the employment of gaskets or the like. By the employment of the disk 76, which covers the greater portion of the upper area of the diaphragm 72, it will be apparent that the liability of the diaphragm buckling or becoming distorted is reduced to a minimum, and said diaphragm will be at all times sufficiently sensitive to respond to any variations of pressure.

By the employment of the lugs 14 on the valve 10 seen in Fig. 9 in conjunction with the stem 16, the latter is fitted accurately with respect to the seat 15 between said lugs, so that said valve 10 and stem 16 will aline and reciprocate simultaneously.

It will further be apparent that in case it is desired to replace the main valve 10, the same is readily accessible by removing the bottom closure 18 whereupon the spring 24 and valve 10 can be readily withdrawn and the valve seat 6 can also be readily removed, as is evident.

It will thus be seen from the foregoing that I have made provision for enabling any portion of the valve casing to be readily taken apart according to requirements for the purposes of inspection or repair, and all other portions of the valve which it may be necessary to inspect at any time are equally readily accessible, without necessitating the employment of special tools.

If the reducing valve is employed as a regulator for an engine, when the engine is shut off, no steam is used, and there is practically no rise in pressure. In other valves of the double seated and piston type, the pressure immediately increases substantially to the boiler pressure when steam is not used at the outlet, as it is impossible to make a double seated type of valve as tight as a single seated one.

The top regulatng diaphragm has a support cast in the top to prevent the diaphragm from bulging from pressure which causes them to crack at the outer diameters. The diaphragm can be replaced when the pressure is on the inlet side of the reducing valve.

The outer case holding the diaphragm and surrounding the pilot valve can then be removed which renders the pilot valve readily accessible for examination. The outer case and diaphragm complete can also be used on other types of valves or can be exchanged for one of a different area if it is desired to do this to accommodate it for a special pressure or a special use. After the diaphragm is taken off the pilot valve can be readily removed for inspection or grinding, thereby enabling anyone to make repairs, when necessary. The lower edge of the pilot valve forms a steam tight joint to prevent the high pressure steam passing to the low pressure side.

The main cylinder is held between the top flanges of the valve and is shaped in such a manner as to make a tight joint with an inside and outside bearing, so that in drawing down the bolts, it will not spring out of shape or distort the shape of the cylinder.

The cylinder forms a single joint with the top and is easily removed or replaced. The main valve seat is screwed in to insure its being steam tight and is provided with heavy lugs to facilitate its removal. The main valve is guided and can be reground to render it tight in case wear takes place. The piston and main valve are made in separate pieces in order to prevent their warping or shrinking out of shape due to the heat of the steam.

The lower partition of the piston is shaped conical or tapering to meet the stem below, as such construction is less liable to expand horizontally than it would if it were made straight across its area and presented a solid body of metal for lateral expansion.

The springs under the main valve and the pilot valve carry very little tension and are not essential in regulating but serve to keep such valves closed when not in use.

It will further be apparent that all parts of the valve are centered from its vertical axis so that such parts all have either steam or water on them. If the diaphragm is at the side of the valve, it will, when in use, be half full of water and half full of steam, and as the top half is exposed to the steam and the lower half to the water, unequal expansion results.

It will be clear from the foregoing that all examinations or repairs are made without disconnecting any steam pipes and each part is accessible and independent of other parts. Upon the removal of the screws 74, the diaphragm 72 can be replaced. Upon the removal of the polygonal nut 69, the auxiliary pilot valve 47 can be removed for repairs or regrinding without removing these screws 74. As the whole top comes off together or as a unit, removal of the bolts 39 will allow special flange 34 and cylinder 29 and piston 17 to be lifted out. This is done without disturbing the pilot valve or its casing or the controlling diaphragm above.

After the cylinder 29 and piston 17 are removed, the operator can remove the bottom plug 18 and the main valve 11 can be taken out to regrind or a new valve and seat can be used to replace these if worn too much to grind or reface.

It will now be apparent that I have devised a novel and useful pressure regulating valve, which embodies the features of advantage enumerated as desirable in the statement of the invention and the above description, and while I have, in the present instance, shown and described preferred embodiments thereof which will be found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a pressure regulator valve, a sectional valve casing, one casing section having an inlet, an outlet, and a valve seat therebetween, a main valve to engage said seat, a removable piston casing having a flange provided with inside and outside bearings secured between juxtaposed casing sections, a piston in said piston casing, controlling said main valve and subjected on one side to fluid pressure from said outlet, a pilot valve controlling passage of fluid to said piston to actuate it, and controlling means for said pilot valve, said means being subjected on one side to a substantially constant pressure and on the opposite side to pressure of fluid from said outlet.

2. In a pressure regulator valve, a sectional valve casing, one casing section having an inlet, an outlet, and a valve seat therebetween, a main valve to engage said seat, a removable piston casing having a flange secured between juxtaposed casing sections and having its opposite sides recessed, a piston in said piston casing, controlling said main valve and subjected on one side to fluid pressure from said outlet, a pilot valve controlling passage of fluid to said piston to actuate it, and controlling means for said pilot valve, said means being subjected on one side to a substantially constant pressure and on the opposite side to pressure of fluid from said outlet.

3. In a pressure regulator valve, a valve casing having an inlet, an outlet, and a removable seat therebetween, a main valve to engage said seat and provided with guide vanes forming a pocket, a piston to actuate said main valve and having an extension seated in said pocket, a pilot valve to control passage of fluid from said inlet to said piston to actuate it, and means to actuate said pilot valve including a spring to effect its movement in one direction and a member subjected to fluid pressure from said outlet to effect movement of said pilot valve in a reverse direction, said valves and pistons being arranged in axial alinement.

4. In a pressure regulator valve, a sectional valve casing having an inlet, an outlet, and a seat between them, a main valve to engage said seat, a removable piston casing having a flange secured between juxtaposed casing sections, a piston in said piston casing to move said main valve to open it, a pilot valve casing carried by one of said sections, a pilot valve in said pilot valve casing and removable as a unit from its support, a passage from said inlet to said piston port, controlled by said pilot valve, a diaphragm subjected on one side to the pressure of fluid from said outlet to move said valve in one direction, and a spring to move said diaphragm in a reverse direction.

5. In a pressure regulator valve, a sectional valve casing, one of said casing sections having an inlet, an outlet, and a seat between them, a main valve controlling said seat, a piston cylinder having a flange secured between adjacent sections, a piston in said piston cylinder having a stem bearing against said main valve, pilot valve mechanism secured within juxtaposed sections and removable as a unit when one of said sections is removed and including a pilot valve casing and a pilot valve, a passage from said inlet to said piston controlled by said pilot valve, a diaphragm secured between adjacent casing sections, one of which is removable to provide access to said pilot valve mechanism and a spring to move said diaphragm in one direction, said diaphragm being moved in a reverse direction by pressure of fluid from said outlet.

6. In a pressure regulator valve, a sectional valve casing, the lower of said casing sections having an inlet, an outlet, and a valve seat between them, a main valve controlling said seat, a piston cylinder open at its lower portion and having at its top a laterally extending flange secured between adjacent sections, said flange extending to the outer edge of said sections and being recessed on each bearing side to provide inside and outside bearings, a piston in said piston cylinder having a stem bearing against said main valve, a pilot valve mechanism detachably mounted above said piston and including a pilot valve casing and a pilot valve removable as a unit, a passage from said inlet to said piston controlled by said pilot valve, a diaphragm secured between adjacent casing sections, one of which is removable to provide access to said pilot valve mechanism, and a spring above said diaphragm to move it in one direction, said diaphragm being moved in a reverse direction by fluid pressure from said outlet, and said spring, diaphragm, pilot valve, piston cylinder, piston and main valve being in the same axial plane.

7. In a pressure regulating valve, a sectional valve casing having an inlet and an outlet and a passageway between them, a removable valve seat in said passageway, a valve to close said valve seat, a controlling diaphragm, a pilot valve complete as a unit, a pilot valve casing, a piston cylinder, and a piston open at one end and closed at the other, said closed end being conical, each part being accessible and independent of other parts and all in vertical axial alinement.

FREDERICK L. JAHN.

Witnesses:
E. HAYWARD FAIRBANKS,
C. D. McVAY.